(12) United States Patent
Gandham et al.

(10) Patent No.: US 8,165,092 B2
(45) Date of Patent: Apr. 24, 2012

(54) SYSTEM AND METHOD FOR ADAPTIVE PROACTIVE SCANNING TO SUPPORT FAST HANDOFFS IN MOBILE NETWORKS

(75) Inventors: Shashidhar R. Gandham, Sunrise, FL (US); Amit Shukla, Sunrise, FL (US)

(73) Assignee: XG Technology, Inc., Sarasota, FL (US)

( * ) Notice: Subject to any disclaimer, the term of this patent is extended or adjusted under 35 U.S.C. 154(b) by 350 days.

(21) Appl. No.: 12/653,021

(22) Filed: Dec. 7, 2009

(65) Prior Publication Data
US 2010/0150111 A1 Jun. 17, 2010

Related U.S. Application Data

(60) Provisional application No. 61/201,172, filed on Dec. 8, 2008.

(51) Int. Cl.
*H04W 4/00* (2009.01)
(52) U.S. Cl. ...................................................... 370/331

(58) Field of Classification Search .................. None
See application file for complete search history.

(56) References Cited

U.S. PATENT DOCUMENTS

| | | | | | |
|---|---|---|---|---|---|
| 5,778,316 | A | * | 7/1998 | Persson et al. | 455/434 |
| 5,794,146 | A | * | 8/1998 | Sevcik et al. | 455/434 |
| 2009/0310560 | A1 | * | 12/2009 | Gandham et al. | 370/331 |

* cited by examiner

*Primary Examiner* — Hassan Phillips
*Assistant Examiner* — Prenell Jones
(74) *Attorney, Agent, or Firm* — Dennis L. Cook, Esq.

(57) ABSTRACT

A scanning technique to select the best channel a mobile handset needs when approaching handoff is described. More specifically a system and method for an adaptive proactive scanning mechanism in which the rate of scanning is determined by the necessity to handoff and battery power is disclosed.

2 Claims, 2 Drawing Sheets

| Channel | BTS ID | RSSI (dBm) | Downlink interference | Uplink Interference | Load | SiNR (dB) |
|---|---|---|---|---|---|---|
| 1 | 33344 | -70 | High | High | Low | 20 |
| 3 | 33344 | -78 | Low | Low | Low | 12 |
| 11 | 33344 | -81 | Low | Medium | Medium | 9 |
| 13 | 32155 | -76 | Medium | Low | Medium | 14 |
| 15 | 32156 | -82 | Low | Low | Low | 8 |

Neighbor BTS

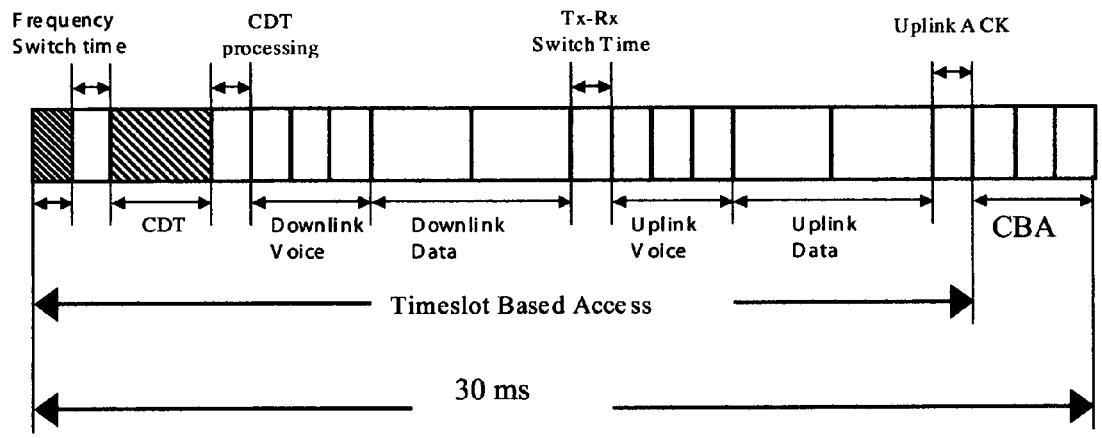

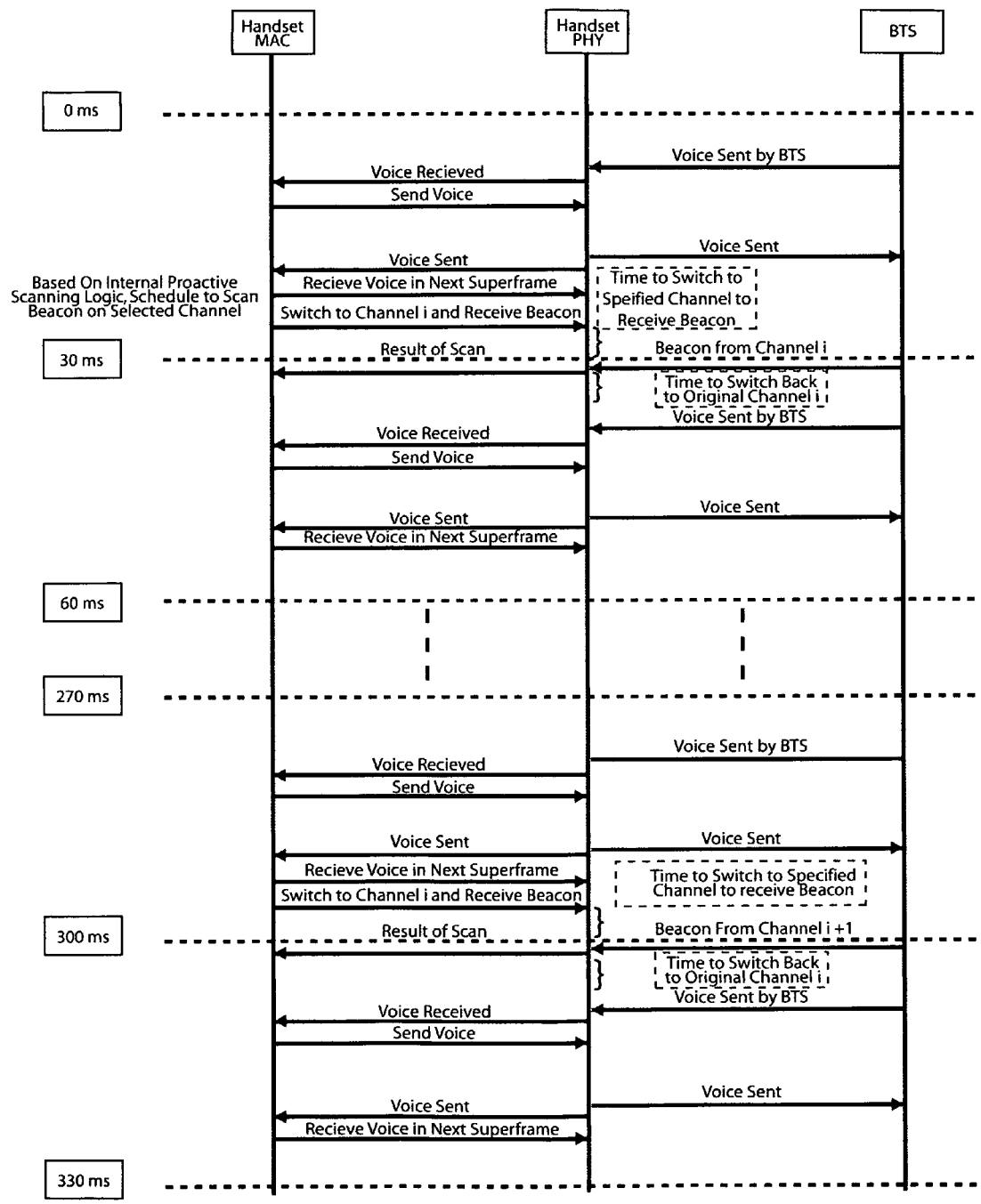

SYSTEM AND METHOD FOR ADAPTIVE PROACTIVE SCANNING TO SUPPORT FAST HANDOFFS IN MOBILE NETWORKS

CROSS-REFERENCE TO RELATED APPLICATION

The present application claims the benefit of previously filed Provisional Patent Application Ser. No. 61/201,172.

FIELD OF THE INVENTION

This invention addresses the need to transport high bit-rate data and voice to multiple users over wired and wireless means. In wireless networks where multiple base stations are deployed, handsets may handoff from one base station to the other while in a voice call. In this disclosure a scanning technique to select the best channel the mobile handset needs when approaching handoff is described. More specifically a system and method for an adaptive proactive scanning mechanism in which the rate of scanning is determined by the necessity to handoff is disclosed.

BACKGROUND OF THE INVENTION

The invention disclosed in this application uses any type modulation and works with a method of modulation now known by its commercial designation, xMax. This new wireless physical layer technology developed by xG Technology Inc., referred to as xMAX, enables extremely low power omni-directional transmissions to be received in a wide area. Using xMAX, significant bandwidth can be made available for supporting various wireless applications. Voice Over IP (VoIP) based cellular services are now being developed using xMAX. In xMAX-based cellular networks both the base station and the handsets will be equipped with an xMAX transceiver. A mobile device (xMAX handset) in such a network will be free to move in an area covered by multiple xMAX base stations. Although this system and method for an adaptive proactive scanning mechanism in which the rate of scanning is determined by the necessity to handoff as described herein is disclosed in the preferred embodiment as being used in these types of integer cycle and pulse modulation systems it can be implemented on any of the broad band wireless technologies like WiMax, WiBro, WiFi, 3GPP and HSDPA, or any other type of wired or wireless voice or data systems.

A heterogeneous MAC protocol proposed to support VOIP traffic in xMAX wireless networks has been discussed in previously filed patent applications U.S. Ser. Nos. 12/069, 057; 12/070,815; 12/380,698; 12/384,546; 12/386,648; 12/387,811; 12/387,807; 12/456,758; 12/456,725; 12/460, 497; 12/583,627; 12/583,644; 12/590,472; 12/590,469, and 12/590,931 which are incorporated by reference into this disclosure. In the heterogeneous MAC protocol described in these applications, guaranteed timeslots are assigned to forward VOIP packets, temporary timeslots are assigned to forward data packets and contention based access is used to exchange control messages. Note that this heterogeneous MAC protocol is used here as a reference protocol and similarly xMAX as a reference wireless network. The idea of a system and method for an adaptive proactive scanning mechanism in which the rate of scanning is determined by the necessity to handoff as described herein can be used in other relevant systems.

BRIEF SUMMARY OF THE INVENTION

The invention disclosed in this application was developed for and is described in the preferred embodiment as being used in any integer cycle or impulse type modulation and more particularly a method of modulation known by its commercial designation, xMAX, but can be implemented on WiFi, 3GPP, HSDPA or any other type of wired or wireless voice or data systems.

Mobile devices handoff on a regular basis due to degradation of channel quality that results from mobility, channel impairment, and localized interference. In most of the mobile systems a handoff generally involves switching to a new channel. Whenever a handoff needs to be carried out a major decision that needs to be made is which channel to switch to. In order to select the best channel the mobile needs to scan the available set of channels and estimate the channel conditions. The latency involved in scanning affects the capability of the mobile device to handoff in a seamless fashion. Periodic proactive scanning of the channels can be performed to eliminate the scanning latency. However, periodic scanning drains the limited battery-supplied energy available at mobile devices. This invention disclosure describes an adaptive proactive scanning mechanism in which the rate of scanning is determined by the necessity to handoff. Thus, the standby time of the handset is not compromised in order to ensure that the required information about channel conditions is available whenever a mobile needs to handoff.

For a fuller understanding of the nature and objects of the invention, reference should be made to the following detailed description taken in connection with the accompanying drawings.

DESCRIPTION OF THE DRAWINGS

For a fuller understanding of the nature and objects of the invention, reference should be made to the accompanying drawings, in which:

FIG. 1 is a diagram showing a Super-frame structure;

FIG. 2 is an example of a table maintained by the handset; and,

FIG. 3 is a flow chart showing message flow during proactive scanning.

DETAILED DESCRIPTION OF THE INVENTION

In cellular networks, a mobile device has to handoff from one tower to another on a regular basis. The dominant reasons behind regular handoffs include mobility, channel impairments, and localized interference. Localized interference is most prominent in systems operating in the ISM, or any publicly shared band. Here, it is assumed that adjacent channel interference and co-channel interference are handled by system design and cell planning respectively.

In most systems a handoff requires the mobile device to switch to another channel. To perform a successful channel switch the mobile should be able to select the best channel from a set of available channels. This process entails scanning other channels to obtain an estimate of channel conditions. Channels conditions might be quantified by some metrics like RSSI, SINR, and multi-path delay spread. Depending upon the number of available channels in the system, the scanning process can be latency intensive. This latency is a major contributing factor to the overall handoff latency. In order to ensure seamless mobility one needs to reduce the channel scan latency.

A naive approach to mitigate the scanning latency involves periodically scanning other channels irrespective of the current channel conditions. This proactive approach ensures that the information necessary for initiating a channel switch is readily available when needed. However, the downside is that frequent scans are a drain on the limited battery-supplied power that is typical to mobile devices. As a result the proactive scanning mechanism will reduce the standby time of mobile devices.

In this invention disclosure an adaptive proactive scanning methodology is presented. The approach minimizes the number of scans while at the same time ensuring that the information required to select the best channel is always available. Thus, a significantly longer battery life is achieved while minimizing the channel switch latency.

Adaptive proactive scanning is based on the principle that a mobile device should scan other channels only when necessary. For example, degradation in channel conditions due to motion or interference can trigger scanning. The scanning rate is also adaptable and is based on conditions of the channel on which the mobile is currently communicating.

A channel switch during an active voice session is a time critical process, thus proactive scanning is necessary in such a scenario. However, when the mobile device is not in a voice session, it does not face any time constraints during channel switch as it moves from one cell to another. As a result proactive scanning is not necessary in such a scenario.

During a voice call different scan modes are defined; each corresponding to a specific scan rate. Information gathered during scanning in maintained in a database by the mobile nodes. When a call is initiated the device performs a fast scan where it tries to collect channel information of all channels in a short span of time. Fast scan ensures that the database on channel conditions is initialized. After fast scan is completed the device enters slow scan mode where it scans other channels at a much lower rate in order to conserve power. Slow scan mode will ensure that the mobile device has information about channel conditions in cases wherein the channel conditions deteriorate abruptly. Abrupt deterioration of channel conditions might be due to an interferer that shows up or because the mobile device entered into the coverage area of the interferer. Note that the channel condition information obtained in slow scan mode might be stale. Even though the information is outdated it might be handy in performing quick handoff and avoid channels affected by interference. If a gradual degradation in channel conditions is observed a trigger is generated that forces the device to enter intermediate scan mode, allowing the device to collect data at a faster rate.

To explain the detailed operation of the adaptive proactive scanning mechanism a multi channel xMAX system is used as an example. Note that the proposed method is equally applicable to other mobile cellular systems as well.

A Multi-frequency xMAX system operates in the 900 MHz ISM band and encapsulates frequencies from 902 MHz to 928 MHz. It splits the 26 MHz band into 18 1.44 MHz wide channels, each providing a maximum data rate of 1 Mbps. Since an xMAX mobile device operates in the ISM band it may face interference from other ISM band devices.

xMAC is the medium access protocol used by base stations and mobile devices in xMAX networks. In each channel the time domain is split into 30 millisecond super-frames. Refer to FIG. 1 for the super-frame structure. A super-frame consists of (i) Beacon transmitted by the base station, (ii) Control Data Timeslot (CDT) that contains MAC signaling information that the base station transmits to various mobiles, (iii) downlink voice timeslots, (iv) downlink data timeslots, (v) uplink voice timeslots, (vi) uplink data timeslots, and (v) contention based timeslots for mobile devices to transmit MAC signaling messages to the base station.

Beacons are transmitted at the beginning of the super-frame at the same time instance on all channels. A beacon allows synchronization between the handset and the base station (BTS). A handset is not required to receive every Beacon; it only receives one Beacon per hyper-frame. A hyper-frame consists of 18 super-frames, for a more detailed description of super-frames and hyper-frames, refer to the previous patent applications listed above.

To understand the importance of proactive scanning it is important to first understand the handoff process in xMAX. Operation in the ISM band makes xMAX vulnerable to localized interference from other ISM band devices. Interference avoidance is achieved by switching from the affected channel to another channel. Thus a robust handoff mechanism is required that has rapid response time and can handle frequent channel switches.

A conventional handoff approach would usually consist of three major phases:

Scanning Phase—during this phase the handset scans and collects information about other channels in the vicinity.

Resource Acquisition Phase—during this phase the handset selects a suitable channel and requests the Base Station to assign timeslots on that channel.

Traffic Transfer—Once timeslots are acquired all traffic is shifted to that channel.

The scanning phase is time intensive and contributes to overall handoff latency. This can be avoided to a large extent with the help of proactive scanning. The handoff process in xMAX incorporates this mechanism. It is based on a staggered, multi-step approach where the mobile device monitors the channel conditions on all channels and based on the level of deterioration on the current channel, generates internal triggers. Each trigger has a pre-defined purpose and is used to initiate a specific action in the handoff process. In the preferred embodiment there are three triggers that are defined as follows:

Trigger 1 (Handoff possible)—Increases the rate of proactive scans by the handset.

Trigger 2 (Handoff Imminent)—Forces the handset to select a new channel and acquire provisional timeslots.

Trigger 3 (Handoff Complete)—transfers all traffic to the new channel.

For a detailed description of the handoff mechanism in xMAX please refer to the U.S. patent application Ser. No. 12/387,807, "Provisional Hand-off Mechanism in a Heterogeneous MAC protocol for Wireless Networks", listed above.

It is now clear that proactive scanning is an important component in the overall handoff paradigm. This section presents the implementation level details of the scanning mechanism in the preferred embodiment, xMAX. The MAC layer of xMAX networks is designed to facilitate scanning of other channels while actively communicating on the current channel. The physical layer (PHY) of an xMAX mobile device can be switched to a different channel at the beginning of a super-frame, receive the Beacon from another channel, and switch back to the current channel in time to receive CDT. To accommodate for the channel switching time a guard time of 0.5 ms is provided between the Beacon and CDT transmissions.

The MAC layer at the handset maintains a table of detected channels with one entry per channel. When PHY receives a beacon, it also calculates RSSI, SiNR and perceived interference on that channel. This information is passed on to the MAC, which updates the corresponding entry in the table. FIG. 2 depicts an example of such a table. In the event of channel degradation, if a handoff is triggered, the handset will pick the most suitable frequency channel from the list and initiate the channel switch. Since recent channel information is available, the handset is not required to perform additional scans before initiating the channel switch process. Thus, scanning delay is eliminated leading to a significant reduction in channel switch latency.

As mentioned earlier, frequently scanning other channels leads to higher power consumption at the handset. Based on the disclosed adaptive proactive scanning system and method explained above the following scan modes are defined:

Fast Scan—One channel is scanned every super-frame. This mode is initiated when a voice session begins; it allows the handset to obtain a snapshot of all channels in a short time frame. After a Fast Scan the handset enters Slow Scan mode.

Intermediate Scan—One channel is scanned every 4 super-frames. This mode is active when the first trigger is generated by the handset. The trigger indicates that some degradation is observed in channel conditions and a switch may happen at some point. Thus channel information needs to be collected at a faster rate.

Slow Scan—One channel is scanned every hyper-frame. Thus 18 hyper-frames are necessary to scan all available channels in the system. This is the default scan state and is active when no triggers have been generated.

The scan modes are dependent on the current state of the handset as follows:

No Voice call in progress—In this state the handset does not scan any available channel. As the handset moves from one cell to another, it can search for other channels and do a channel switch as it approaches the cell boundary. Since no voice session is active, the switch is not time critical.

Voice call in progress—Multiple cases exist for this scenario. The handset monitors the channel conditions (namely Signal to Interference and Noise Ratio) on the current channel and based on certain criteria, generates triggers that lead to a frequency switch. The various scenarios are as follows:

Case 1: No triggers are active. Here, the signal strength is sufficiently high and perceived interference is low enough for voice traffic to not be affected. In this case, the handset defaults to Slow Scan mode.

Case 2: $1^{st}$ trigger is active. The $1^{St}$ threshold is breached; it is now time to scan other channels at a faster rate. The handset enters intermediate scan mode. Each time a new channel is picked the process repeats itself.

Case 3: $2^{nd}$ trigger is active. It is now time to initiate a frequency switch. The scan state remains in intermediate scan mode.

Case 4: Handoff is complete. The handset remains in intermediate scan mode until the channel conditions on the new channel improve.

Handset battery power is a critical resource that is directly affected by the frequency of proactive scanning. It is therefore also disclosed that the scan intervals be linked to battery power levels. If the battery level falls below a certain threshold the rate of proactive scanning will be reduced. Thus, a trade-off exists between the handoff latency and battery life. A slower scan rate may lead to increased handoff latency, but it also prolongs the battery life. The message flow during proactive scanning between the handset MAC, the handset physical layer, and the base station is shown in FIG. 3.

Thus, a mechanism to reduce the latency encountered during channel switching and handoffs is disclosed. The latency involved in these channel switches can severely degrade voice quality in mobile networks. Scanning for prospective channels is a major component in the overall latency. The technique of proactive scanning introduced here allows the handset to significantly reduce the scanning latency by periodically scanning other channels. In addition, adaptive scanning rates will ensure that the battery of the mobile is not drained due to scanning when the current channel conditions are satisfactory. Thus, when a channel switch becomes imminent, the handset can simply select a suitable channel instead of scanning for a new channel.

Since certain changes may be made in the above described system and method for proactive scanning to support fast handoffs in mobile networks without departing from the scope of the invention herein involved, it is intended that all matter contained in the description thereof or shown in the accompanying figures shall be interpreted as illustrative and not in a limiting sense.

What is claimed is:

1. A proactive scanning system for mobile node handset handoff between multiple base stations having a medium access control protocol used for forwarding Internet Protocol packets between multiple base stations and mobile nodes in voice over the Intermit protocol systems on a wireless network comprising:

multiple base stations in electrical communication with the Internet;

one or more mobile nodes in wireless electrical communication with one of said multiple base stations;

said multiple base stations and said one or more mobile nodes each having a medium access control protocol;

each of said multiple base stations transmitting a beacon signal; said medium access control protocol having hyper-frames comprised of super-frames containing headers that contain provisional time slots dedicated to handing off a mobile node between a current base station a mobile node is in wireless electrical communication with and a replacement base station;

wherein when one of said one or more mobile nodes is not in a voice session it does not scan for a beacon signal;

wherein when one of said one or more mobile nodes and one of said multiple base stations begins a voice session said mobile node scans for a beacon signal at a fast scan rate of once per super-frame for received signal strength indicators from said beacons of other said multiple base stations in mobile nodes' electrical communication range and said mobile node stores said received signal strength indicators of said multiple base stations then said mobile node begins to scan at a slow scan rate of once per hyper-frame;

wherein when said mobile node detects a threshold minimum signal strength from said current base station said mobile node scans at an intermediate scan rate of more often than once a hyper-frame but less often than once a super-frame for received signal strength indicators from said beacons of other said multiple base stations in mobile nodes' electrical communication range and said mobile node stores said received signal strength indicators of said multiple base stations;

wherein when said mobile node detects an additional threshold minimum signal strength from said current base station it sends a provisional handoff request to a replacement base station that has the strongest stored received signal strength indicator;

wherein said replacement base station receiving said provisional handoff request assigns provisional time slots to said mobile node that sent said provisional handoff request to said replacement base station; and, wherein when said mobile node detects a final threshold minimum signal strength from said current base station it sends a handoff confirm message using said provisional time slots to said replacement base station beginning wireless electrical communication with said replacement base station and also sends a connection break-off message to said current base station breaking off wireless electrical communications with said current base station and said mobile node continues to scan at the intermediate scan rate until signal strength on said replacement base station is above the threshold minimum signal strength.

2. The proactive scanning system for mobile node handset handoff between multiple base stations of claim 1 wherein the rate of scanning by said mobile node is slowed down when said mobile node's battery strength level falls below a set threshold.

* * * * *